April 25, 1967    C. W. JOHNSON    3,315,369
MEASURING INSTRUMENT FOR OPTICAL FRAMES
Filed May 7, 1965

INVENTOR.
CHARLES W. JOHNSON
BY
*Barlow & Barlow*
ATTORNEYS

United States Patent Office 3,315,369
Patented Apr. 25, 1967

3,315,369
MEASURING INSTRUMENT FOR
OPTICAL FRAMES
Charles W. Johnson, Rehoboth, Mass., assignor to Sadler
Bros., Inc., a corporation of Massachusetts
Filed May 7, 1965, Ser. No. 454,006
3 Claims. (Cl. 33—200)

This invention relates to a measuring instrument for an optical frame and especially to the type which receives lenses of an irregular contour.

In the optical industry many frames are measured and designated by the "boxing system" of frame measurement. By the "boxing system" the eye size of the lens is given in A and B measurements. The A measurement is the horizontal distance between the vertical tangents of the lens bevel. The B measurement is the vertical distance between the horizontal tangents of the lens bevel. Frequently in irregular shape lenses the point of tangency on the A and B measurements is not along a line parallel to either a vertical or horizontal of the boxing system, and consequently, mathematics must be resorted to in order to obtain the measurement desired.

This invention relates to an instrument by which the points of tangency may be set at different distances from the measuring scale so that the distance between parallel tangents at right angles to the scale even though it exists at different points from the scale may be measured directly on the instrument.

An object of the invention is to provide a measuring device which may measure directly by application to the lens frame, the A and B measurements in accordance with the boxing system.

Another object of the invention is to provide a device which may have a sufficient range of adjustment so that all frames may be measured even though their lenses are of a regular shape and slanted upwardly and outwardly at a considerable angle.

Another object of the invention is to provide a device which may be simple in its adjustment requiring only a sliding of the parts one with reference to the other in order for it to function in an operable manner.

Another object of the invention is to provide an extremely simple device and one which may be manufactured at a minimum of cost.

With these and other objects in view, the invention consists of certain novel features of construction as will be more fully described and particularly pointed out in the appended claims.

Figure 1:
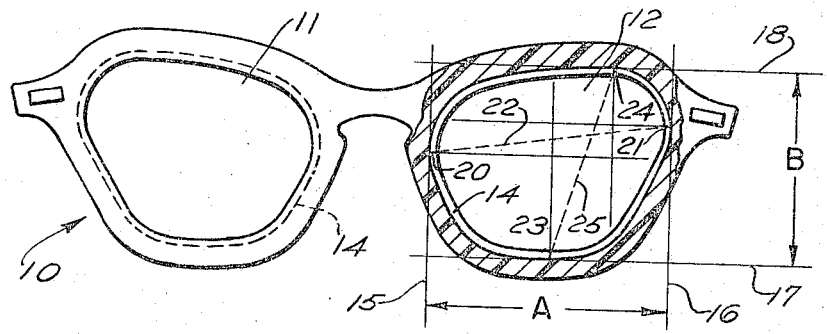
FIG. 1 is a plan view of a lens frame partly in section to show the depth of its groove for the lens and illustrating diagrammatically lines indicating measurement which are taken according to the boxing system.
Figure 2:
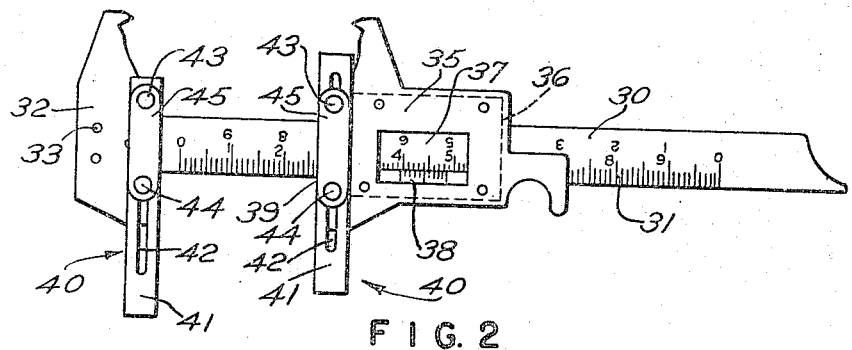
FIG. 2 is a plan view of a measuring instrument equipped with this invention for such an optical frame.

In proceeding with this invention, I have provided both jaws of a measuring instrument with slidable arms which may be moved toward and from the longitudinal body of the instrument so as to project these arms different distances from the body for engagement with different points of an optical frame where the tangency to the lens which fits therein may be located, and when this point is found, then the measurement, usually in meters, may be obtained directly from the scale of the instrument.

With reference to the drawings 10 designates an optical frame having lens openings 11 and 12 each with a groove 14 therein for the reception of a lens.

In order to obtain the A measurement of a lens which fits this frame, a vertical line of tangency 15 is provided along the nasal edge of the lens and a vertical line of tangency 16 is provided along the temple edge of the lens. These lines are parallel and vertical to a horizontal. The B measurement is obtained between a line 17 tangent to the lower edge of the lens and a line 18 tangent to the upper edge of the lens, both tangent to the outermost point of the lens. The lens of the irregular shape to fit the opening 12 will be seen to have its nasal point of tangency at 20 on the line 15 and its temple or outer point of tangency at 21 on the line 16. Thus, a measurement from point 20 to point 21 would be along the line 22 which would not be parallel to the horizontal. Accordingly, this measurement would be inaccurate if taken along this line 22 according to the boxing system, as the shortest distance between the parallel lines 15 and 16 is the distance A which is desired. In a similar manner the point 23 of tangency of the lower line 17 to the lower edge of the lens and the point 24 of tangency of the upper line 18 to the upper edge of the lens would be along a line 25 which is not parallel to either of the lines 15 and 16 of the boxing system, and accordingly, the measurement B if taken along this line 25 would be inaccurate as it is the shortest distance between the lines 17 and 18 which is desired for the B measurement. Heretofore, calculation was entered into in order to correct these measurements and obtain the correct A and B measurement according to the boxing system.

Figure 3:
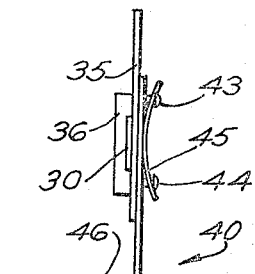
FIG. 3 is an end view looking from the lefthand end of FIG. 2.

The instrument which is the subject of this invention provides the A and B measurements directly and comprises an elongated body 30 having a scale 31 along one edge of the body. A first jaw 32 is provided at one end of the body 30 and may be riveted thereto as at 33 to fix it in relation to the body. A second jaw 35 is equipped with a slideway 36 (FIG. 3) to slide along the body 30 and is provided with an opening 37 with a vernier scale at 38 so that the edge of the jaw 39 in cooperation with the vernier scale 38 may be read to a tenth of one of the graduations on the scale 31.

Figure 4:
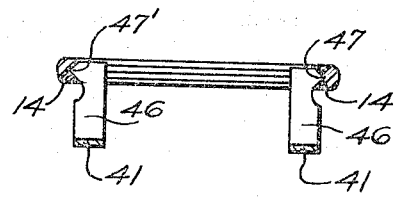
FIG. 4 is a fragmental sectional view illustrating the contact arms of the instrument as engaging in the lens grooves of an optical frame.
Figure 5:
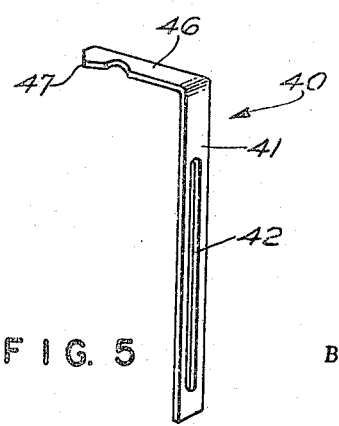
FIG. 5 is a perspective view of one of the arms.

Each of the jaws is provided with an L-shaped arm designated generally 40 and seen in perspective in FIG. 5. This arm is generally L-shaped with a mounting portion 41 slotted as at 42 to be slidably mounted on one of the jaws by means of pins 43 and 44 extending through the slot of the arm while a leaf spring 45 acting between the head of the pins 43 and 44 and the portion 41 at either side of the slot 42 urges the arm against the face of the jaw with sufficient friction so as to hold it in place but yet permit it to be manually slid along the slot in a movement at right angles to the longitudinal extent of the body 30 or laterally thereof. Each one of these arms is provided with an offset finger serving as a work contact portion 46 having a work engaging contact point 47 of generally pointed shape so as to reach into the V-shaped groove 14 of the lens rim as seen in FIG. 4, there being two of these work contacting points extending in opposite directions there shown and designated as 47 and 47'.

In order to measure a lens frame such as shown in FIG. 1 to obtain the A measurement, the arms 40 will be adjusted at uneven distances from the body 30 carrying a scale so that one contact point 47 will contact the location 20 while the other contact point 47 will contact the point designated 21. However, both of these contact points being on parallel arms or carried so that movement is parallel to the arms as they project from the body 30 at right angles thereto will give the correct A distance even though the direct distance from point 20 to point 21 is not at right angles to the lines 15 and 16, and in the same way the B measurement may be obtained to obtain the correct designation according to the boxing system by a direct reading from the measuring instrument and without the necessity for calculation.

I claim:

1. A measuring instrument for optical frames comprising an elongated body having scale indicia thereon, a first work contacting jaw fixed to the body and a second work contacting jaw slidable along the body toward and from the first jaw, arms carried by said jaws, said arms extending laterally of said body and in the plane of the body and parallel to each other and each arm having a finger extending transversely of the arm and offset from said plane providing work contacting points distant from the body and means for slidably mounting one of said arms on its jaw for movement in a line parallel to the other arm toward and from said body to locate its work contacting point a distance from the body different than the location of the work contacting point of the other arm.

2. A measuring instrument as in claim 1 wherein resilient means holds the movable arm in adjusted position and frictionally retards its sliding movement from one position to another.

3. A measuring instrument as in claim 1 wherein the arms are both slidable on the jaw on which they are mounted.

References Cited by the Examiner

UNITED STATES PATENTS

| | | | |
|---|---|---|---|
| 85,430 | 12/1868 | Burrows | 33—143 |
| 591,709 | 10/1897 | Weber | 33—143 |
| 1,333,453 | 3/1920 | Sardo | 33—167 |
| 1,510,285 | 9/1924 | Lustenberger | 33—143 |
| 2,677,894 | 5/1954 | Belgard | 33—143 X |
| 2,799,942 | 7/1957 | Ehler | 33—143 X |
| 3,114,206 | 12/1963 | Eckert | 33—167 |
| 3,145,475 | 8/1964 | Alford | 33—143 X |

LEONARD FORMAN, *Primary Examiner.*

W. D. MARTIN, *Assistant Examiner.*